US011803260B1

(12) United States Patent
Kuzo et al.

(10) Patent No.: US 11,803,260 B1
(45) Date of Patent: Oct. 31, 2023

(54) DETECTING THE ANGLE OF PASSIVE ROTARY KNOB PARTIALLY LOCATED ON TOUCH SCREEN

(71) Applicant: Cypress Semiconductor Corporation, San Jose, CA (US)

(72) Inventors: Taras Kuzo, Lviv (UA); Jens Weber, Pinneberg (DE); Viktor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/886,174

(22) Filed: Aug. 11, 2022

(51) Int. Cl.
G06F 3/039 (2013.01)
G06F 3/044 (2006.01)
G06F 3/038 (2013.01)
G06F 3/0362 (2013.01)

(52) U.S. Cl.
CPC ............ G06F 3/0393 (2019.05); G06F 3/038 (2013.01); G06F 3/0362 (2013.01); G06F 3/044 (2013.01)

(58) Field of Classification Search
CPC ...... G06F 3/0362; G06F 3/038; G06F 3/0393; G06F 3/044
See application file for complete search history.

(56) References Cited

U.S. PATENT DOCUMENTS

| | | | |
|---|---|---|---|
| 9,547,428 B2* | 1/2017 | Lengeling | G06F 3/04847 |
| 9,690,400 B2* | 6/2017 | Krishnakumar | G06F 3/04883 |
| 10,191,569 B2* | 1/2019 | Uno | G06F 3/0362 |
| 10,248,228 B2* | 4/2019 | Minyu | G06F 3/0487 |
| 10,331,239 B2* | 6/2019 | Grant | G06F 3/03547 |
| 10,452,191 B2* | 10/2019 | Yildiz | G06F 3/04886 |
| 10,459,528 B2* | 10/2019 | Yildiz | G06F 3/04847 |
| 10,496,216 B2* | 12/2019 | Stone | G06F 3/04162 |
| 10,884,520 B2* | 1/2021 | Togashi | G06F 3/041 |
| 11,175,775 B2* | 11/2021 | Ikegami | G06F 3/044 |
| 2006/0256090 A1* | 11/2006 | Huppi | G06F 1/1616 345/173 |
| 2008/0238879 A1* | 10/2008 | Jaeger | G06F 3/0338 345/173 |
| 2012/0194457 A1* | 8/2012 | Cannon | G06F 3/0488 345/173 |
| 2014/0168132 A1* | 6/2014 | Graig | G06F 3/0362 345/174 |
| 2015/0169080 A1* | 6/2015 | Choi | G06F 3/041 345/184 |
| 2018/0074639 A1* | 3/2018 | Powell | G06F 3/044 |
| 2018/0113527 A1* | 4/2018 | Klein | G06F 3/0393 |

(Continued)

Primary Examiner — Michael Pervan

(57) ABSTRACT

An apparatus and method for detecting the angle of passive rotary knob partially located on a touch screen are described. In embodiments the apparatus includes a touch screen having an array of sensors and a dial that includes a base and a knob attached to the base and rotatable relative to the base. The knob includes a plurality of conductive elements, each positioned a distance from a center point of the knob. A controller is also included, coupled to the touch screen, and configured to receive signals generated by one or more sensors of the array in response to the sensors detecting one or more of the conductive elements. The controller can determine a rotational angle of the knob based on the signals generated by the one or more of the sensors in the array while a portion of the knob does not overlap the array of sensors.

19 Claims, 9 Drawing Sheets

(56) References Cited

U.S. PATENT DOCUMENTS

| | | | |
|---|---|---|---|
| 2018/0129335 A1* | 5/2018 | Stone | G06F 3/04162 |
| 2018/0129336 A1* | 5/2018 | Files | G06F 3/0442 |
| 2018/0129347 A1* | 5/2018 | Files | G06F 3/04162 |
| 2018/0129348 A1* | 5/2018 | Files | G06F 3/0441 |
| 2019/0012003 A1* | 1/2019 | Grant | G06F 3/0312 |
| 2019/0250740 A1* | 8/2019 | Okuzumi | G05G 1/105 |
| 2021/0064152 A1* | 3/2021 | Tanaka | G06F 3/0362 |
| 2021/0200337 A1* | 7/2021 | Takaoka | G06F 3/0393 |
| 2021/0286470 A1* | 9/2021 | Takada | G06F 3/0362 |
| 2022/0317783 A1* | 10/2022 | Jeon | H03K 17/975 |
| 2022/0317785 A1* | 10/2022 | Kleffel | G06F 3/0393 |

\* cited by examiner

DETECTING THE ANGLE OF PASSIVE ROTARY KNOB PARTIALLY LOCATED ON TOUCH SCREEN

BACKGROUND

An electronic display typically uses capacitive, resistive, inductive, optical, acoustic or other technology to determine the presence, location and or motion of a finger, stylus, and/or other objects. The present disclosure will be made with reference to electronic displays that employ capacitive sensor arrays for determine the presence, location and or motion of an object, it being understood the present disclosure should not be limited thereto.

Capacitive sensor technology functions by measuring the capacitance of a capacitive sensor element (i.e., sensor), and evaluating for a change in capacitance caused by a conductive element that touches or is near the sensor. When a conductive element (e.g., a finger, metal element, or other object) comes into contact or close proximity with a capacitive sensor, its capacitance changes and the conductive object can be detected. Capacitance changes can be measured by an electrical circuit that converts signals corresponding to changes in capacitances of the capacitive sensors into digital values for subsequent processing in accordance with software instructions stored in memory.

Capacitive sensors may be used to replace mechanical buttons, dials/knobs, and other similar mechanical user interface controls, while providing reliable operation under harsh conditions.

BRIEF DESCRIPTION OF THE DRAWINGS

The present technology may be better understood, and its numerous objects, features, and advantages made apparent to those skilled in the art by referencing the accompanying drawings.

The use of the same reference symbols in different figures indicates similar or identical items.

DETAILED DESCRIPTION

Figure 1:
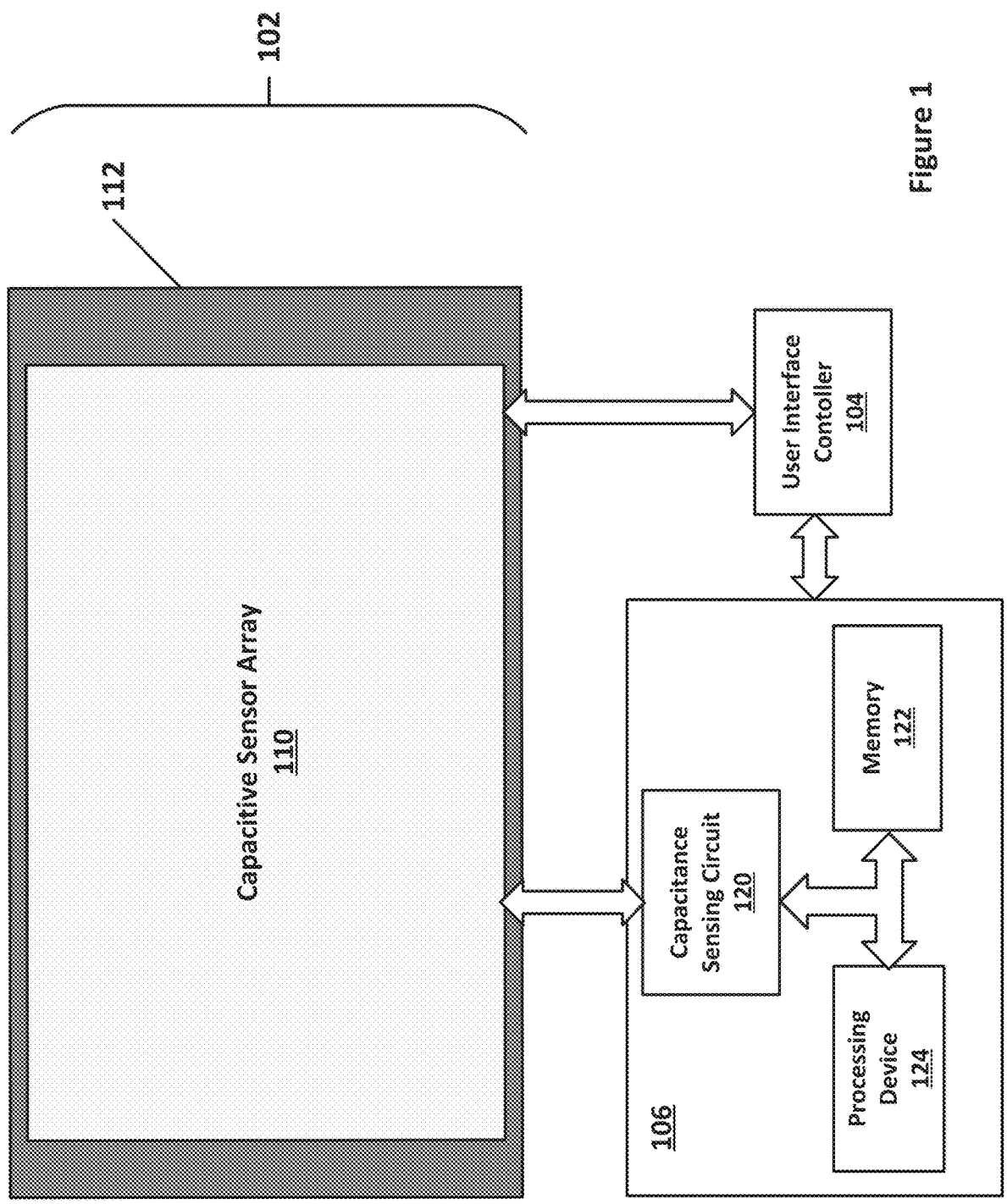
FIG. 1 illustrates a block diagram illustrating one embodiment of an electronic display.

In the following description, for purposes of explanation, numerous specific details are set forth in order to provide a thorough understanding of the present embodiments. It will be evident, however, to one skilled in the art that the embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Capacitive sensor arrays are ubiquitous in today's industrial and consumer markets, and provide many user interface options. Capacitive sensors in these arrays may be used to replace the functionality of mechanical buttons, dials/knobs, and other similar mechanical user interface controls. Despite this, dials/knobs remain a popular option among users in many applications, for example in cars due to their native haptic and human habit preferences. However, the size of touch screens in cars and other applications often reduces the space available for dials.

The embodiments described herein are directed at detecting the angle of a passive dial when it fully or partially overlaps a touch screen having an array capacitive sensors. In one embodiment, detection is implemented through conventional capacitive sensing techniques. The dial may be a passive device, and thus may not include electronics of any kind (e.g., on-board measurement system) or be powered in any way. The dial may include a plurality of conductive elements (hereinafter referred to as indexes), which may be contained in the dial and positioned such at least one of the indexes touches or is in close proximity to the touch screen. In this way, the at least one of the indexes should have electrical or capacitive coupling with the touch screen to enable determination of rotational angle of the dial. As the dial is rotated, the indexes rotate, and thus a change in the rotational angle of the dial may be detected via the capacitive sensor array.

Described herein are devices, methods, and systems that can determine the position and/or rotational angle of a passive dial that is partially or fully overlapping a touch screen. In one embodiment, a touch screen is disclosed that includes a plurality of capacitive sensors. A dial is also disclosed and includes two or more indexes. The dial may fully or partially overlap an active area of the touchscreen such that at least one of the indexes are proximate to the face of the active area and move in conjunction with a rotation of the passive dial. The touch screen may further comprise a touch screen controller operatively coupled to the touch screen. The touch screen controller may detect an angle of the passive dial based at least in part on responses of a set of capacitive sensors to the at least one of the indexes as the passive dial rotates.

Although described with respect to a touch screen that employs a capacitive sensor array, the embodiments of the present disclosure may be realized in a touch screen utilizing any appropriate sensing system (e.g., inductive, resistive). For example, inductive sensing systems may include one or more sensing elements that pick up loop currents induced by a resonating coil or pair of coils. Some combination of the magnitude, phase, and frequency of the currents may then be used to determine positional information. In another example, resistive sensing systems may include a flexible and conductive first layer that is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

FIG. 1 is a block diagram illustrating one embodiment of an electronic display 100. The electronic display 100 may include a touch screen 102, a user interface controller 104, and a touch screen controller 106. The touch screen 102 may include a capacitive sensor array 110 and frame 112. The sensor array 110 may be coupled to the touch screen controller 106, which may be coupled to a host computing device (not shown).

In one embodiment the sensor array 110 is a two-dimensional array of capacitive sensors. When a conductive object comes into contact or in close proximity with a capacitive sensor, its capacitance changes. Capacitance changes can be measured by touch screen controller 106, which converts signals corresponding to measured capacitances of the capacitive sensors into digital values.

Touch screen controller 106 includes a capacitance sensing circuit 120 in data communication with a memory 122 and a processing device (e.g., a microcontroller, a digital signal processor, etc.) 124. In one embodiment, a multiplexer circuit may be used to connect a capacitive sensing circuit 120 of the touch screen controller 106 with the sensor array 110 in various configurations. Capacitance sensing circuit 120 converts signals corresponding to measured changes in capacitances that are provided by the capacitive sensors of array 110. Capacitance sensing circuit 120 converts the signals into respective digital equivalents for subsequent processing by processing device 124. Memory 122 is configured to store data and instructions executable by the processing device 122. Processing device 124 can process the digital values provided by capacitive sensing circuit 120 in accordance with instructions stored in memory 122, in order determine the angle of the passive dial/knob that is fully or partially overlapping sensor array 110 as will be more fully described below.

Figure 2:
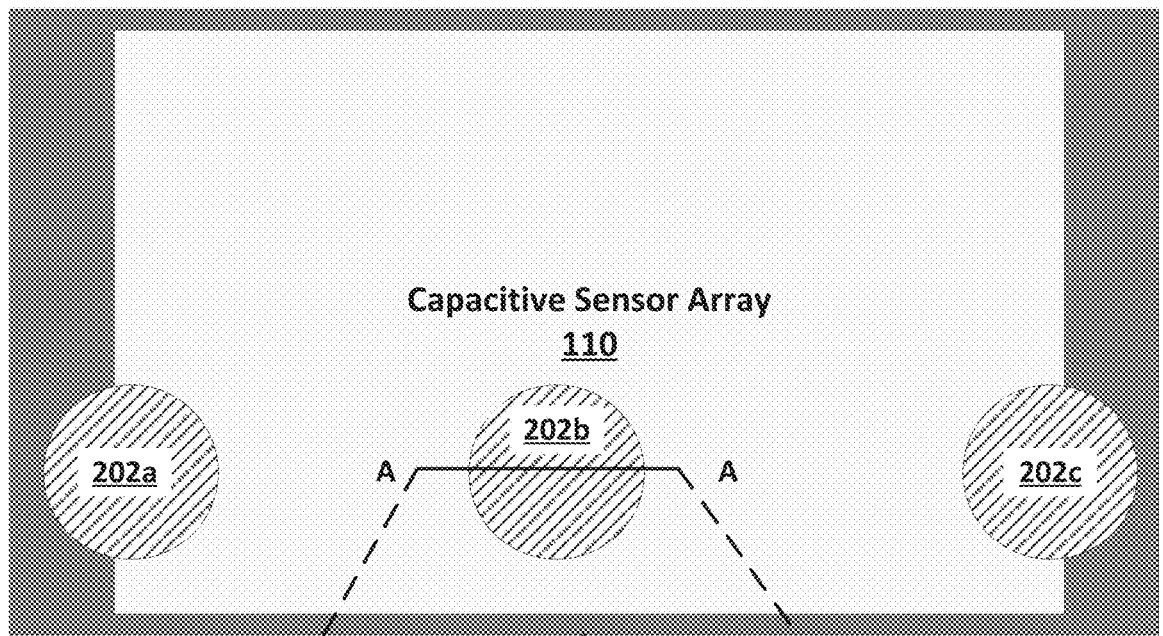
FIG. 2 illustrates the touch screen of FIG. 1 and example dials.

FIG. 2 illustrates the touch screen 102 of FIG. 1 with example dials 202a-202c. Dials 202a and 202c partially overlap sensor array 110. Dial 202b fully overlaps sensor array 110. In one embodiment, a dial partially overlaps sensor array 110 when at least a portion of at least one index of the dial is partially or fully outside sensor array 110 as will be more fully described below.

A dial 202 can be any appropriate rotary mechanism with a center line perpendicular to and positioned inside or outside the sensor array 110. Thus a center of dial 202a or 202b may be mounted on frame 112, with part of the dial 202 overlapping an area that is not within the active area 110 of the touch screen 102. The dial 202 may be a passive device, and thus may not include electronics of any kind (e.g., on-board measurement system) or be powered in any way.

Figure 3:
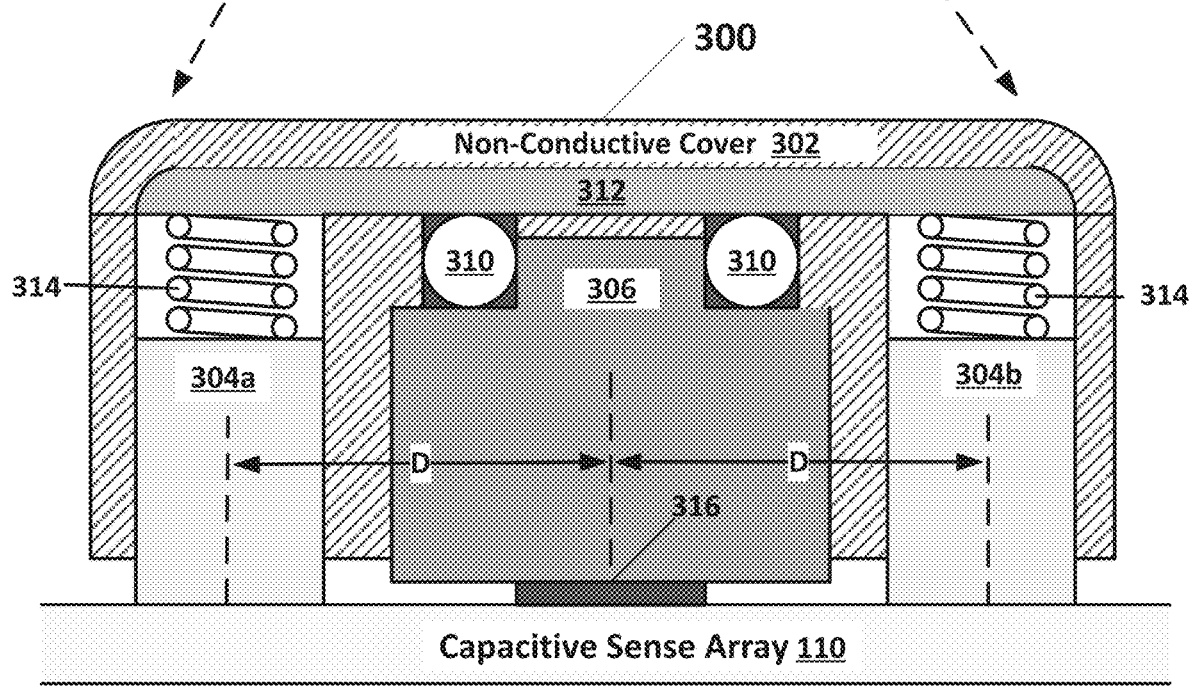
FIG. 3 illustrates a cross sectional view of a dial from FIG. 2.

The number of indexes within the dial may determine the minimal overlap of the dial with sensor array 110 that is needed for determining the dial's rotational angle. FIG. 3 illustrates a cross sectional view of example dial 202b taken along line A-A. Dial 202b includes a knob 300 with two indexes 304a and 304b, contained and positioned in knob 300 such that the indexes 304 can be in close proximity (e.g., 0.1-0.5 millimeters) to or in contact with array 110. In this way, an index 304 may have electrical or capacitance coupling with the array 110 such that the rotational angle of the dial 202 can be detected. Indexes 304 may take form in cylinders that are formed from a conductive metal such as copper. Indexes with other cross sectional shapes such as ovals, squares, rectangles, etc., are contemplated. The center lines of indexes 304 are spaced a distance D from the center line of the dial.

Knob 300 is rotatably connected to base 306. Knob 300 includes a non-conductive cover 302, a conductive plate 312, biasing springs 314, and bearings 310 contained in and movable within a race. Movement of the bearings within the race enable the indexes 304 to rotate about the centerline of base 306. Indexes 304 are biased by springs 314 to maintain indexes 304 in close proximity or contact with sensor array 110. Springs 314 may also electrically connect indexes 304 through conductive plate 312. Nonconductive cover 302 electrically isolates conductive plate 312 and indexes 304 from a user of dial 202b. Base 306 is fixedly mounted on capacitive sensor array 110 or frame 112 by fastener 316 (e.g., epoxy). For the purposes of explanation only, dials 202a and 202c are identical in structure.

As a dial, such as dial 202 is rotated, indexes, such as indexes 304a and 304b, rotate around base 306, and the rotation angle of the dial 202 may be detected through the capacitive sensor array 110 as discussed more fully described herein. For example, the touch screen controller 106 may obtain from the capacitive sensor array 110, capacitance signal data sets as index 304 rotates, and position detection firmware executing on the touch screen controller 106 identifies rotational angles of the dial based on the peaks in the data sets. The firmware can calculate the precise rotational angle of dial 202 using a correlation algorithm, and display the angle on, for example, touch screen 102 in any appropriate manner. As used herein, the rotational angle of the dial or index may be referred to as the current angle of the dial.

Figure 4:
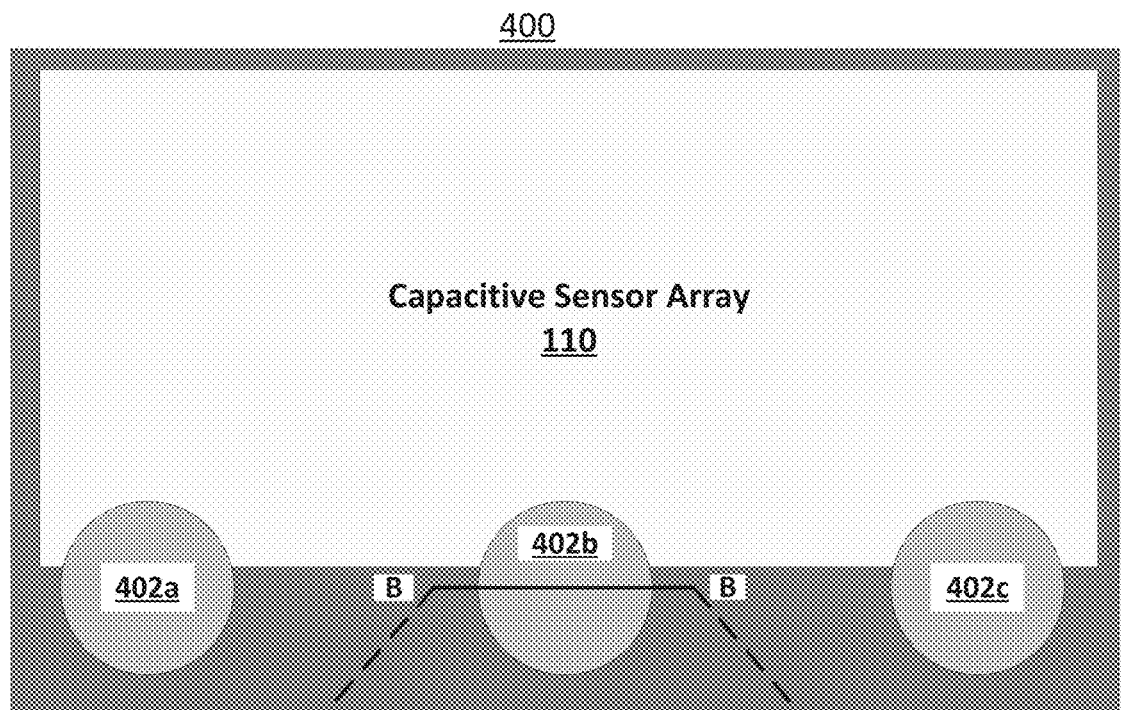
FIG. 4 illustrates the touch screen of FIG. 1 with alternative dials.

It should be noted that dials can have more than two indexes 304. FIG. 4 illustrates alternative dials 402. More particularly, FIG. 4 shows a touch screen 400 with example dials 402a-402c. Touch screen 400 is substantially similar to touch screen 102, except for one difference; touch screen 400 has a different frame 404. In the embodiment of FIG. 4, each dial 402 partially overlaps sensor array 110. As will be described, dials 402 have three indexes. With this configuration, the minimum overlap (e.g., 40%) with sensor array 110 that is needed to determine the rotational angle of dial 402, is less than the minimum overlap (e.g., 50%) needed by dial 202.

Dial 402 can be any appropriate rotary mechanism (e.g., a knob) with a center line positioned perpendicular to and inside or outside sensor array 110. In FIG. 4, the centers of all dials 402 (402a÷402c) are positioned outside sensor array 110. Thus each passive dial 402 overlaps an area that is not within the active area 110 of the touch screen 102. The dial 402 may be a passive device, and thus may not include electronics of any kind (e.g., on-board measurement system) or be powered in any way.

Figure 5:
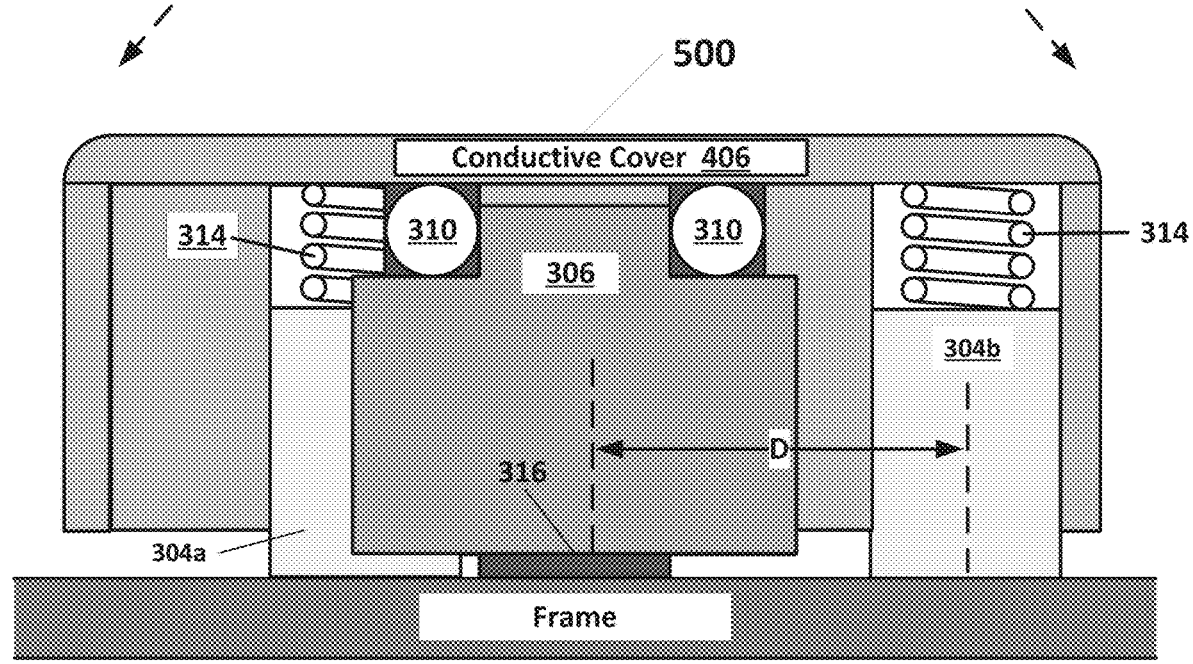
FIG. 5 illustrates a cross sectional view of a dial from FIG. 4.

Dials 202 and 402 are similar in many regards. FIG. 5 illustrates a cross sectional view of dial 402b taken along line B-B. The dial 402b includes a knob 500 rotatably connected to base 306. Knobs may include 2, 3, or more indexes. Knob 500 includes three indexes 304a-304c (304c is not shown in FIG. 5), which may be contained and positioned in knob 500 such that the indexes 304 can be in close proximity (e.g., 0.1-0.5 millimeters) to or in contact with array 110. In this way, an index 304 may have electrical or capacitance coupling with the array 110 so that the rotational angle of the dial 402 can be determined. Indexes 304 may be cylindrical and formed from a conductive metal such as copper. Knob 500 also includes a conductive cover 406, springs 314, a base 306, and bearings 310 contained in and movable within a race. Indexes 304 are biased by springs 314 to maintain indexes 304 in close proximity to or in contact with sensor array 110. Springs 314 may also electrically connect indexes 304 to conductive cover 406. Conductive cover 406 electrically connects indexes 304 together and to a user who is manipulating dial 402b. Base 306 is fixedly mounted on capacitive sensor array 110 or frame 404 by fastener 316 (e.g., epoxy).

As the dial 402 is rotated, indexes 304 rotate around base 306, and the rotational angle of the dial 402 may be detected through the capacitive sensor array 110 as the indexes 304 pass over it. The touch screen controller 106 may obtain from the capacitive sensor array 110, capacitance signal data sets as the indexes 304 rotate, and position detection firmware executing on the touch screen controller 106 identifies the rotational angle of dial 402 based on peaks in the data set. For example, the firmware can calculate the precise angle of dial 402 using a correlation algorithm and display the angle on, for example, touch screen 110 in any appropriate manner. As used herein, the rotational angle of the dial may be referred to as the current angle of the dial or index.

Figure 6:
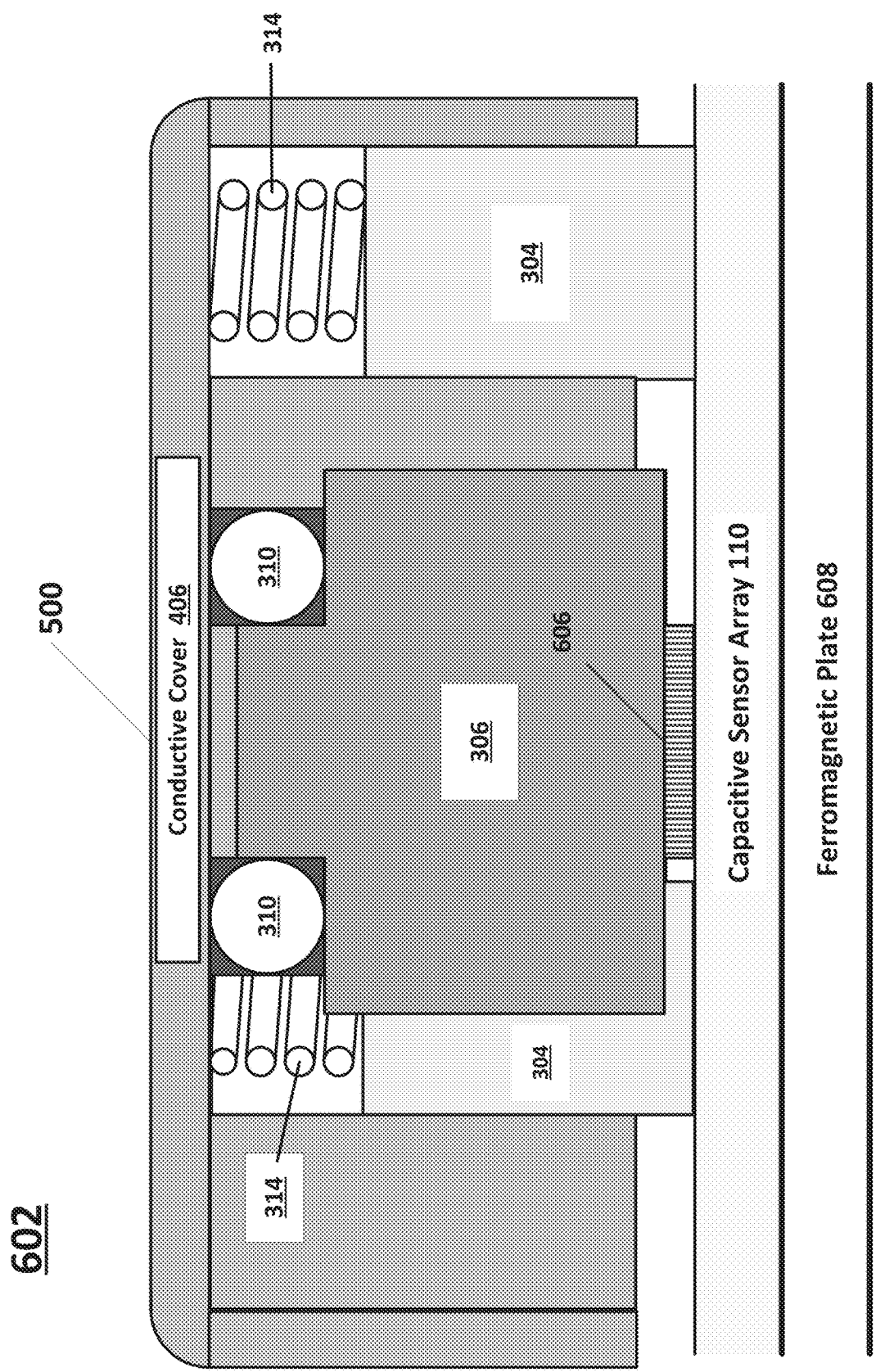
FIG. 6 is a cross-sectional view of another dial that uses the permanent magnet to fix to the touchscreen

FIGS. 3 and 5 show dials 202 and 402 that are fixedly connected to touch screen 110. In an alternative embodiment, dials are movable with respect to a touch screen 110. FIG. 6 is a cross-sectional view of a dial 602 with a center line that is positioned over sensor array 110, which in turn is positioned over a ferromagnetic plate 608. Dial 602 is similar to dial 402 shown in FIG. 4, but with one difference; fastener 316 is replaced by permanent magnet 606. In this embodiment, magnet 606 is fixedly connected to base 306, but dial 602 is releasably connected to array 110. Magnets are attracted to ferromagnetic materials. Assuming array 110 is thin enough, the attractive force between magnet 606 and ferromagnetic plate 608 can maintain the positon of dial 602b on the touch as it is rotated screen until the dial is moved by a user.

Figure 7:
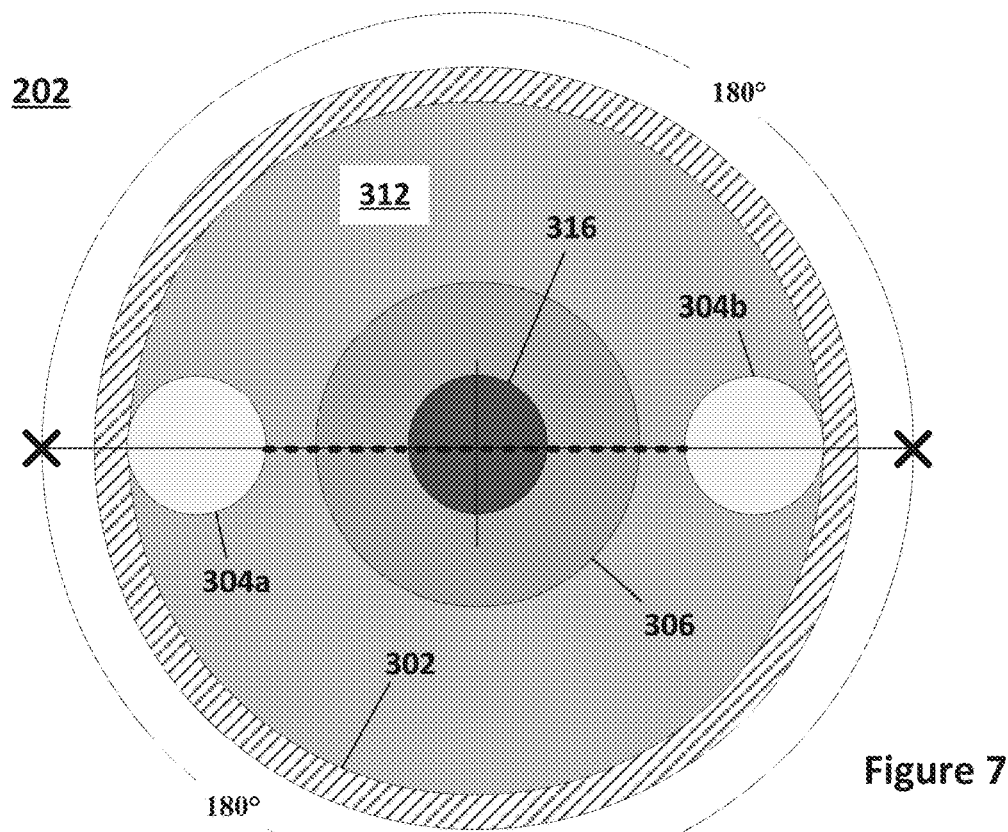
FIG. 7 illustrates a bottom view of the shown in FIGS. 3.
Figure 8:
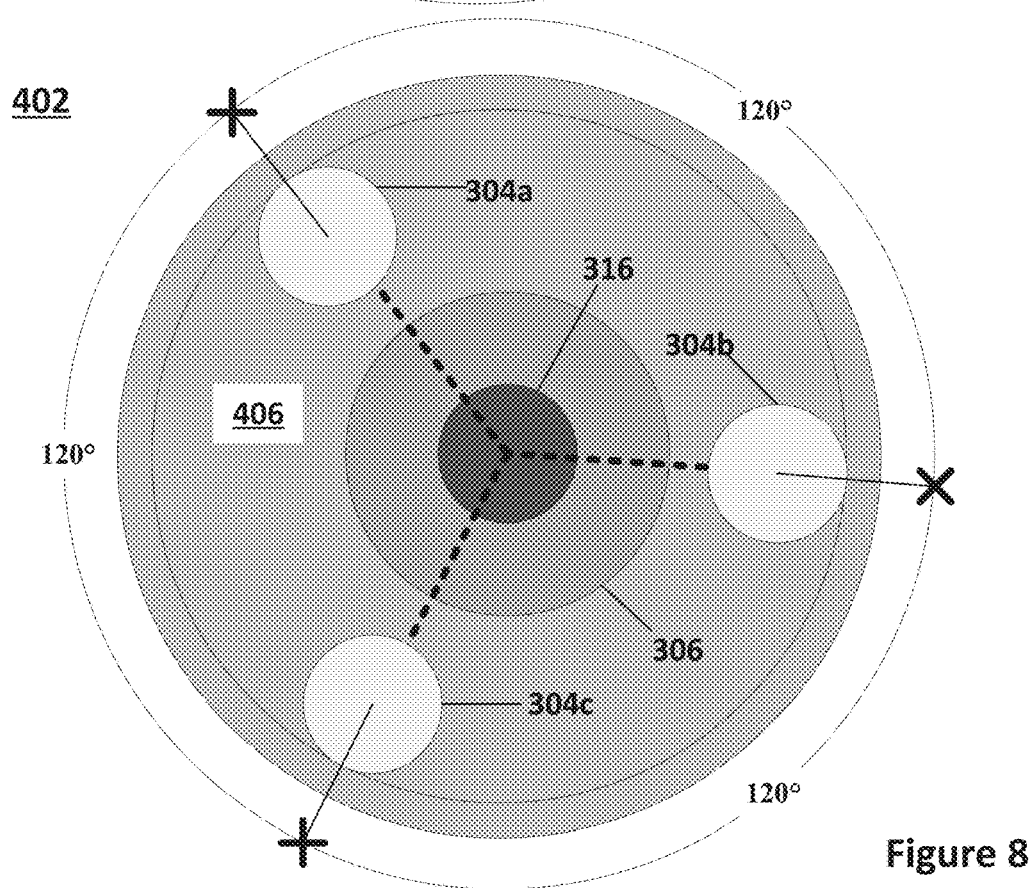
FIG. 8 illustrates a bottom view of the shown in FIGS. 5.

FIGS. 7 and 8 illustrate dials 202 and 402, respectively, of FIGS. 3 and 5, respectively, when viewed from the bottom. In FIG. 7 indexes 304a and 304b are offset from each other by an angle A=180°. In addition, the indexes 304 are equidistant from the center of dial 202. All indexes 304 are presumed to have the same diameter. Indexes 304 are rotatable about the center of base 316. FIG. 8 shows dial 402 with three indexes 304. Each of these indexes 304 is also equidistant from the center of dial 402. In the embodiment shown, indexes 304 are spaced by angle A=120°. It should be noted that dials of the present disclosure should not be limited to the dials shown in FIGS. 7 and 8. A dial with four indexes equally spaced by 90°, may also be contemplated.

Figure 9:
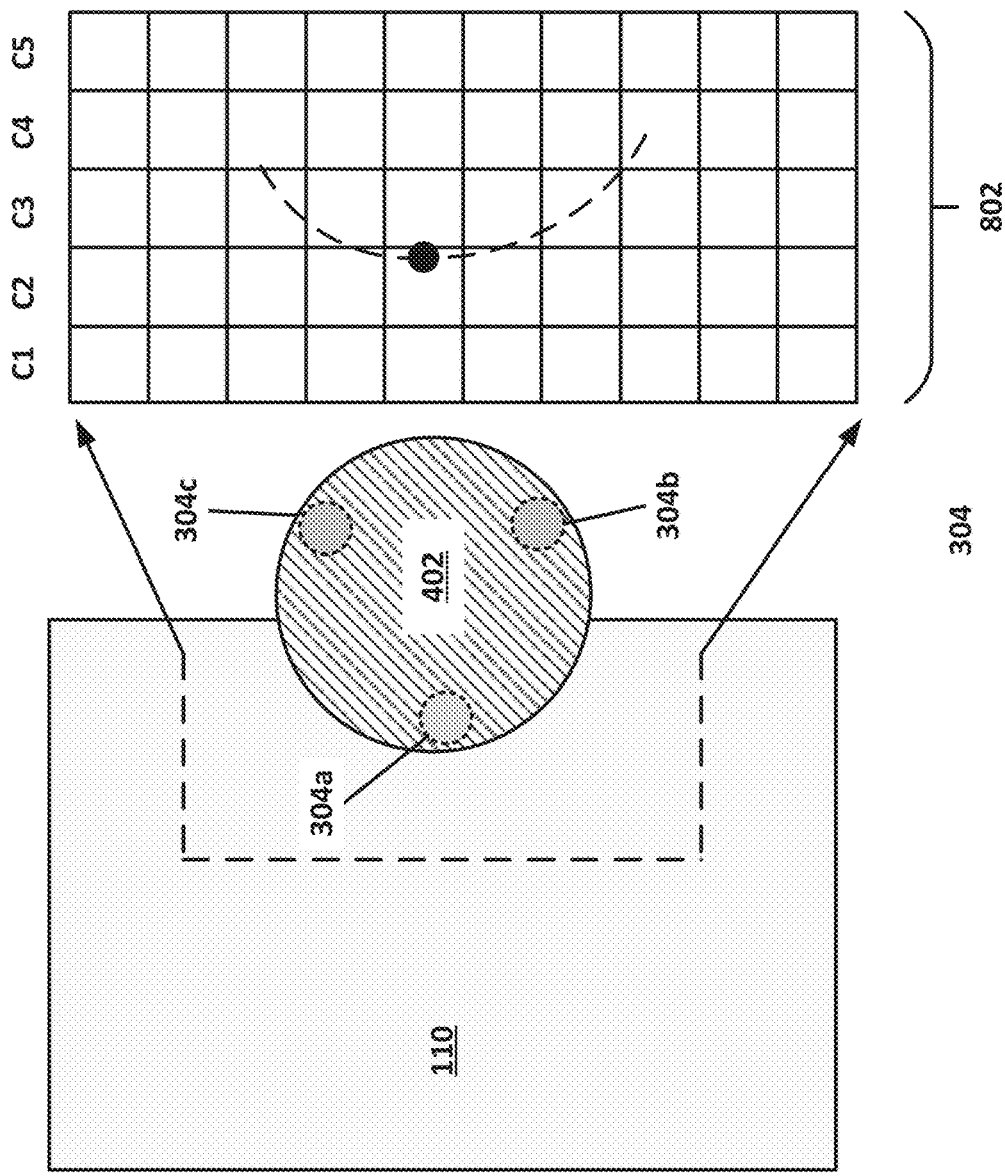
FIG. 9 illustrates operational aspects for detecting indexes of a dial.
Figure 10:
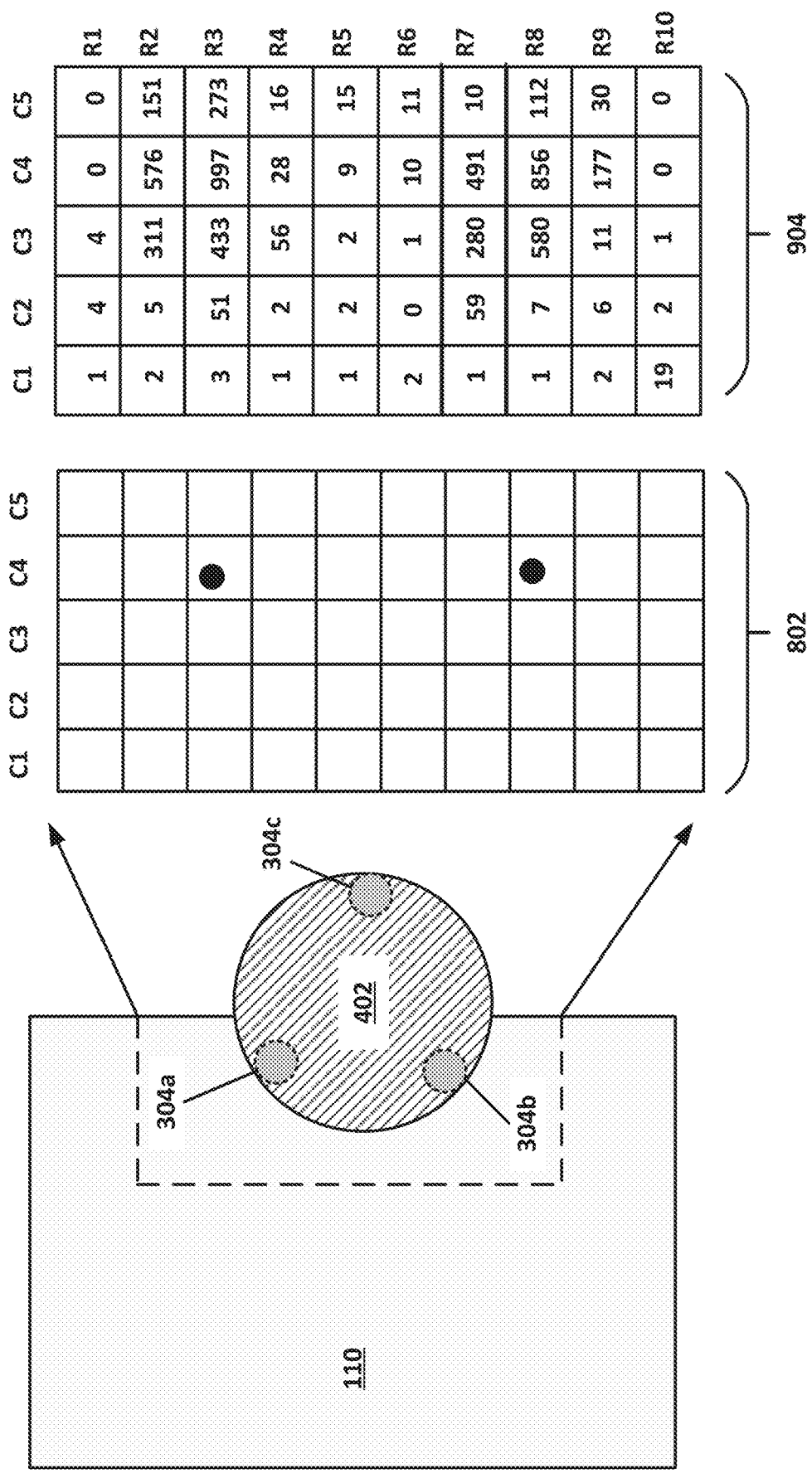
FIG. 10 illustrates operational aspects for detecting indexes of a dial.

When index 304 comes into contact or close proximity with a sensor of sensor array 110, its capacitance changes, and the index 304 can be detected. With continuing reference to FIG. 1, capacitance changes in sensors can be measured by a capacitance sensing circuit 120, which converts signals corresponding from the capacitive sensors of array 110 into digital values for subsequent processing by processing device 124 in accordance with instructions stored in memory 122. FIGS. 9 and 10 illustrate operational aspects for detecting indexes 304 of dial 402 as it rotates. FIG. 9 shows dial 402 partially overlapping array 110. In this Figure only index 304a is positioned above array 110. FIG. 10 shows dial 402 of FIG. 9 after it is rotated. In this figure indexes 304a and 304b are positioned above array 110.

FIGS. 9 and 10 each show a sensors matrix 802 of the sensor array 110. FIGS. 9 and 10 also show touch heatmaps 804 and 904, respectively, representing capacitance signals provided by respective sensors of panel 110 as result of panel scanning. Array 110 is scanned on a periodic basis by sensing circuit 120. In FIG. 9 the set of values of heatmap 804 are generated by capacitance sensing circuit 120 based on a scan of capacitance signal outputs of respective sensors matrix 802. As can be seen in FIG. 9, the value 967 corresponding to the sensor in column C2 and row R5 has the highest localized value, which indicates that an index (i.e., index 304a) is proximate or touching that sensor. Note: when the index moves the highest signal's, value moves too. In FIG. 10 the set of values of heatmap 904 are generated by capacitance sensing circuit 120 based on output signals of respective sensors in panel 802. As can be seen in FIG. 10, the values 997 and 856 have the highest localized values (called local maximums), which indicates indexes 304a and 304b are proximate or sensors in column C4, and rows R3 and R8, respectively. The local maximums move synchronously with movements of the indexes 304. Note: index 304 typically covers more than one sensor in the sensor matrix 802, therefore the index responses are detected from multiple touch sensors at the same time.

Figure 11:
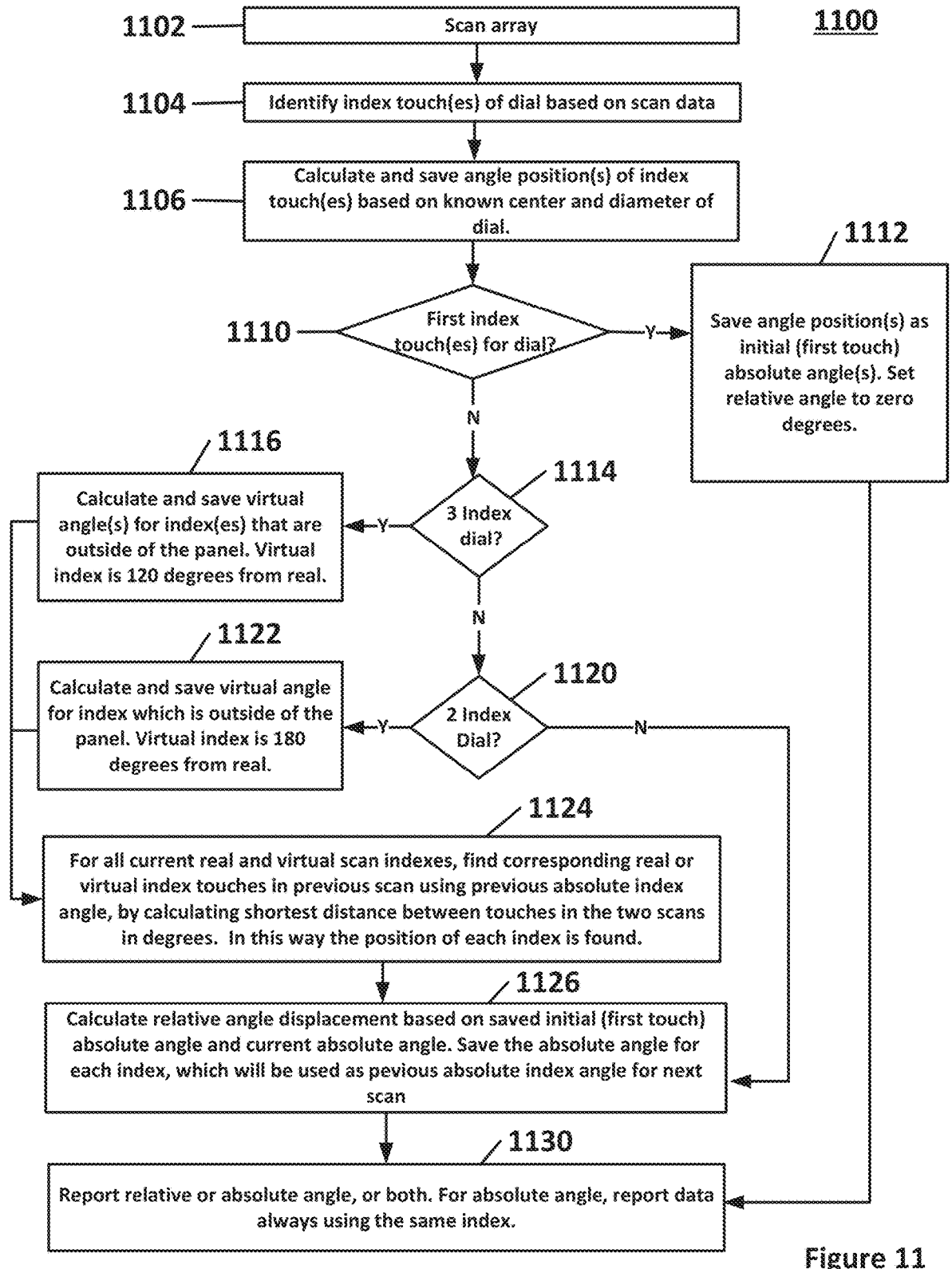
FIG. 11 is a flow chart illustrating operational aspects of an example method implemented in accordance with one embodiment of the present disclosure.

FIG. 11 is a flowchart illustrating relevant operational aspects of a method 1100 performed by processing device 124 of FIG. 1 while executing software instructions stored in memory 122. More particularly, method 1100 shown in FIG. 11 illustrates one embodiment in which processing device 124 calculates the angle of a dial, such as dial 402, based upon a set, such as set 904 shown in FIG. 10, of values collected during a scan of array 110 by capacitance sensing circuit 120. Method 100 can be performed for each dial 202 or 402 shown in FIGS. 2 and 4 respectively. The angle is relative and can be measured against an initial absolute angle. Capacitance sensing circuit 120 periodically scans sensor array 110 in step 1102, and converts signals provided by the capacitive sensors into digital equivalents for subsequent processing by processing device 124. In step 1104, processing device 124 determines locations in the array 110 where one or more indexes 304 of a dial are touching or in close proximity. For example, with reference to FIG. 10, processing device 124 can determine that indices 304a and 304b are touching or in close proximity to sensors at column C4, rows R3 and R8, since these locations define the highest localized values in set 904 by finding the local maximums. Processing device 124 uses locations to calculate the angle of the touches identified in step 1104 using the known center and diameter of the dial.

An initial or absolute angle should be stored for dial 402. Processing device 124 determines in step 1110 whether the index touches identified in step 1104 are the first for the dial. In one embodiment, processing device 124 can access memory 122 to see if an initial absolute angle was previously calculated and stored for the dial. If the memory 122 lacks an initial absolute angle, then processing device 124 stores the angle(s) of step 1106 as an initial (first touch) absolute angle in step 1112, which in turn can be used for calculating a relative angle of the dial. The initial absolute angle is stored in the appropriate location in memory 122. After step 1112, the process proceeds to step 1130 where the relative angle, absolute angle, or both reported and/or displayed.

If processing device 124 determines that memory 122 contains an initial absolute angle in step 1110, the process proceeds to step 1114 or 1120, where processing device 120 determines whether the dial includes three or two indexes 304, respectively. For purposes of explanation, it will be presumed dial 402 includes three indexes 304 like dial 402 shown in FIG. 8. Accordingly, in step 1116, processing device 124 calculates and saves in memory virtual angles for indexes 304 (e.g., index 304c shown in FIG. 10) that are positioned outside of array 110 based upon angles determined in step 1106. In step 1124, processing device 124 finds the position of each index of the dial. Specifically, for all current real and virtual scan indexes, the corresponding real and virtual touches in the previous scan are found using the previous absolute index angle, by calculating the shortest distance between touches in the two scans in degrees as shown in step 1124. In step 1126 the relative angle displacement is calculated based on the saved initial (first touch) absolute and the current absolute angle. The absolute angle for each index is also saved so that they can be used as the previous absolute index angle for the next scan. Lastly, the relative angle, absolute angle or both are reported. For absolute angle reporting, the same index is always used.

Figure 12:
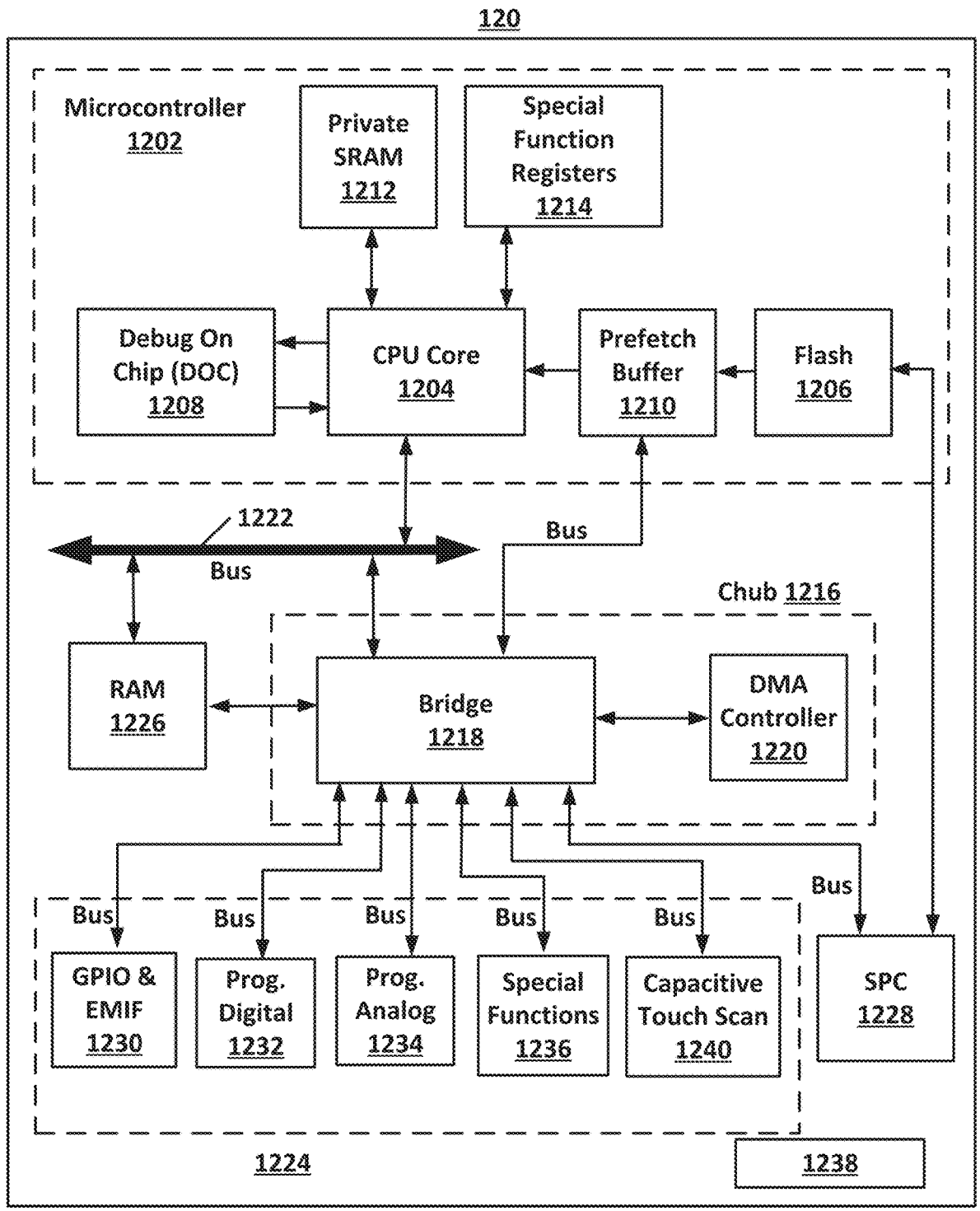
FIG. 12 illustrates an example of the processing device shown in FIG. 1.

FIG. 12 illustrates an embodiment of the data processor 120 employed in FIG. 1. In one embodiment, the data processor 120 takes form in microcontroller 1202. The microcontroller 1202 includes a CPU (central processing unit) core 1204, flash program storage 1206, DOC (debug on chip) 1208, a prefetch buffer 1210, a private SRAM (static random access memory) 1212, and special functions registers 1214. In an embodiment, the DOC 1208, prefetch buffer 1210, private SRAM 1212, and special function registers 1214 are coupled to the CPU core 1204, while the flash program storage 1206 is coupled to the prefetch buffer 1210.

The core architecture may also include a CHub (core hub) 1216, including a bridge 1218 and a DMA controller 1220 that is coupled to the microcontroller 1202 via bus 1222. The CHub 1216 may provide the primary data and control interface between the microcontroller 1202 and its peripherals and memory 122, and a programmable core 1224. The DMA controller 1220 may be programmed to transfer data between system elements without burdening the CPU core 1204. In various embodiments, each of these subcomponents of the microcontroller 1202 and CHub 1216 may be different with each choice or type of CPU core 1204. The CHub 1216 may also be coupled to shared SRAM 1226 and an SPC (system performance controller) 1228. The private SRAM 1212 is independent of the shared SRAM 1226 that is accessed by the microcontroller 1202 through the bridge 1218. The CPU core 1204 accesses the private SRAM 1212 without going through the bridge 1218, thus allowing local register and RAM accesses to occur simultaneously with DMA access to shared SRAM 1226. Although labeled here as SRAM, these memory modules may be any suitable type of a wide variety of (volatile or non-volatile) memory or data storage modules in various other embodiments.

In various embodiments, the programmable core 1224 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1224 includes a GPIO (general purpose IO) and EMIF (extended memory interface) block 1230 to provide a mechanism to extend the external off-chip access of the microcontroller 1202, a programmable digital block 1232, a programmable analog block 1234, and a special functions block 1236, each configured to implement one or more of the subcomponent functions. In various embodiments, the special functions block 1236 may include dedicated (non-programmable) functional blocks and/or include one or more interfaces to dedicated functional blocks, such as USB, a crystal oscillator drive, JTAG, and the like.

The programmable digital block 1232 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1232 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1204) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a L1Nbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1234 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 1234 may support various analog functions including, but not limited to, analog routing, capacitance-sensing, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

The function of the capacitive touch screen scanning can be accomplished with help of the dedicated hardware module 1240. The capacitive touch scan block 1240, after programmed by the CPU core 1204, scans panels of the capacitive sensor array with minimum CPU involvement. The capacitance sensing circuit 120 (FIG. 1) might be same as capacitive scan block 1240 or be combination of the capacitive scan block 1240 and some other modules, for example, programmable analog block 1234 in the different invention embodiments.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus comprising:
   a touch screen comprising an array of sensors;
   a base;
   a knob attached to the base and rotatable relative to the base, the knob comprising a plurality of conductive elements each of which is positioned a distance D from a center point of the knob;
   a controller coupled to the touch screen and configured to receive signals generated by one or more sensors of the array in response to the one or more sensors detecting one or more of the plurality of conductive elements;
   wherein the controller is configured to determine a rotational angle of the knob based on the one or more signals generated by the one or more of the sensors in the array while a portion of the knob does not overlap the array of sensors.

2. The apparatus of claim 1 wherein the base is movable relative to the touch screen.

3. The apparatus of claim 1 wherein each of the sensors comprises a capacitive sensor that generates an electrical field, wherein the capacitive sensor is configured to detect disruptions in the electrical field that is caused by any one of the conductive elements.

4. The apparatus of claim 1 wherein the controller is configured to determine the rotational angle based on the distance D.

5. The apparatus of claim 1 wherein each pair of adjacent conductive elements has an angle between them when measured with respect to the center point of the knob.

6. The apparatus of claim 1 wherein the controller is configured to determine the rotational angle while at least a first percentage of knob overlaps the array of sensors and when the knob has only three conductive elements.

7. The apparatus of claim 1 wherein the controller is configured to determine the rotational angle while at least a second percentage of knob overlaps the array of sensors and when the knob has only two conductive elements.

8. The apparatus of claim 1 wherein the sensors define a detection pitch-size, and wherein each of the conductive elements has a cross-sectional area that is not less than the detection pitch-size.

9. The apparatus of claim 1 wherein the plurality of conductive elements are electrically connected to each other.

10. An apparatus comprising:
    a touch screen comprising an array of sensors;
    a movable base;
    a knob attached to the movable base and rotatable relative to the movable base, the knob having two or three conductive elements each of which is positioned a distance D from a center point of the knob;
    a controller coupled to the electronic display and configured to receive signals generated by one or more sensors of the array in response to detecting one or more of the plurality of conductive elements;
    wherein the controller is configured to determine a position of the movable base on the touch screen after the movable base has moved to the position, and
    wherein the controller is configured to determine the position based on distances between the two or three conductive elements.

11. The apparatus of claim 10 wherein the controller is configured to determine a rotational angle of the knob based on the one or more signals generated by one or more of the sensors in the array while a portion of the knob does not overlap the array of sensors.

12. The apparatus of claim 10 further comprising:
    a metal plate;
    wherein the array of sensors is positioned between the metal plate and the movable base;
    wherein the base comprises a magnet for releasable connecting the base to the array of sensors.

13. The apparatus of claim 10 wherein each of the sensors comprises a capacitive sensor that generates an electrical field, wherein the capacitive sensor is configured to detect disruptions in the electrical field that is caused by any one of the conductive elements.

14. The apparatus of claim 10 wherein the controller is configured to determine the rotational angle based on the distance D.

15. The apparatus of claim 10 wherein each pair of adjacent conductive elements has an angle A between them when measured with respect to the center point of the knob.

16. The apparatus of claim 10 wherein the controller is configured to determine the rotational angle while a first percentage of the knob overlaps the array of sensors and when the knob has only three conductive elements.

17. The apparatus of claim 10 wherein the controller is configured to determine the rotational angle while a second percentage of the knob overlaps the array of sensors and when the knob has only two conductive elements.

18. A method comprising:
    receiving a first set of signals from sensors of an array while one or more of a plurality of conductive elements of a rotatable knob overlap the array, and while another of the plurality of conductive elements does not overlap the array of sensors;
    processing the first set of signals to determine a rotational angle of the knob.

19. The method of claim 18 wherein each of the sensors comprises a capacitive sensor that generates an electrical field, wherein the capacitive sensor is configured to detect disruptions in the electrical field that is caused by any one of the conductive elements.

* * * * *